May 8, 1928.
H. A. BORRESEN
FASTENING MEANS
Filed Sept. 12, 1924
1,668,756
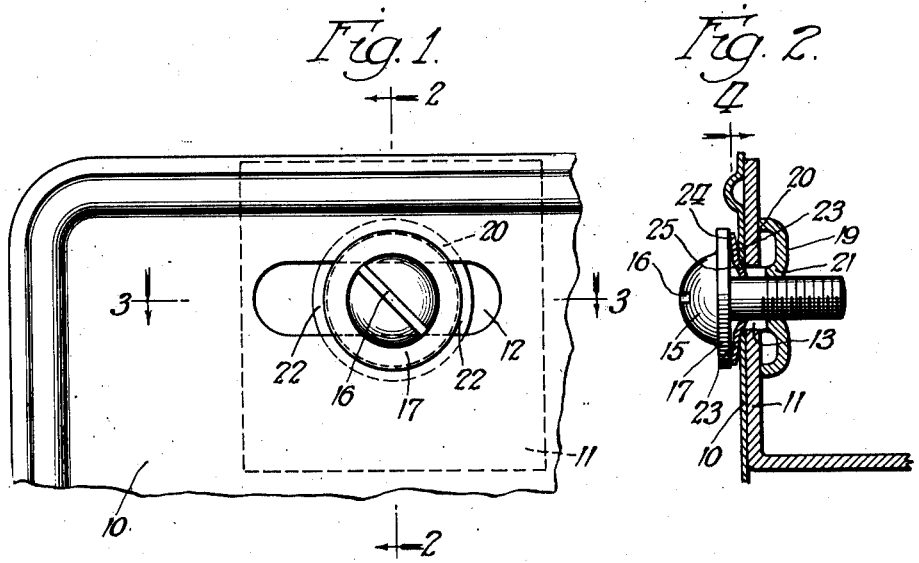
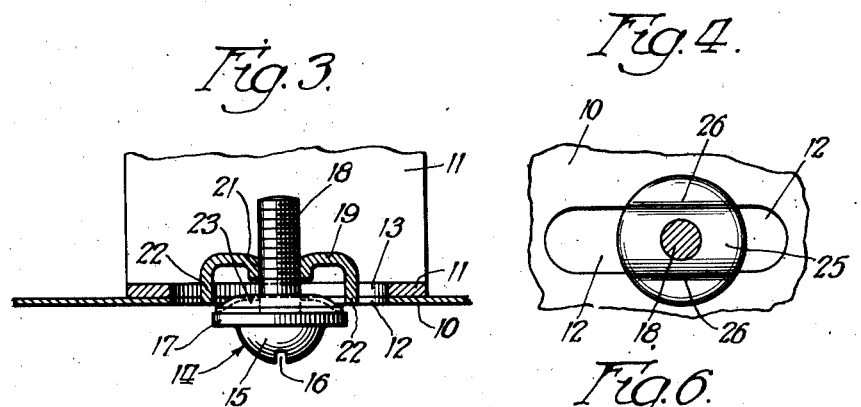
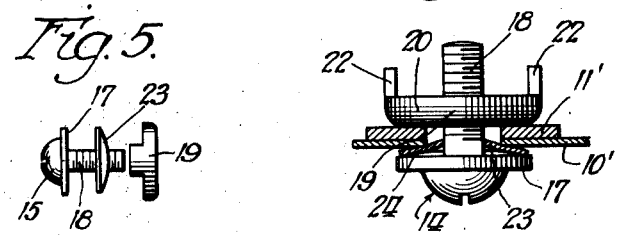
Inventor
Helge A. Borreson
by Willay & Gabel Atty.

Patented May 8, 1928.

1,668,756

UNITED STATES PATENT OFFICE.

HELGE A. BORRESEN, OF CHICAGO, ILLINOIS, ASSIGNOR TO THE C. H. HANSON COMPANY, OF CHICAGO, ILLINOIS, A CORPORATION OF ILLINOIS.

FASTENING MEANS.

Application filed September 12, 1924. Serial No. 737,334.

My invention relates to fastening devices, and more particularly to a fastening device for securing a member such as a license plate to a bracket or other holding device on an automobile.

It is a purpose of my invention to provide a device of the above mentioned character which will firmly hold the license plate but which is simple in construction and can be manufactured cheaply.

It is a further purpose of my invention to provide a device of the above mentioned character that comprises a bolt-like member having a screw-threaded portion with which a screw-thread clamping member is adapted to engage passing through suitable openings in the license plate and holder, said clamping means on the bolt-like member being provided with means for preventing the device from turning relative to the holder and the license plate.

It is a further purpose of the invention to so construct the clamping member co-operating with a bolt-like member that the means for preventing the device from turning may be used for engagement by the fingers to make it easy to screw the clamping member into a position where the holder and the license plate are provided with circular or other openings than the slot-like openings.

It is still another purpose of the invention to provide means for locking the parts in clamping position comprising a cupped washer which is preferably made of resilient material and which engages the head of the bolt-like member with the outer periphery thereof to thus provide a clamping surface against said head at a considerable distance from the center thereof to thus provide a greater leverage for the locking means and increasing the holding action thereof.

It is still a further purpose of the invention to provide a resilient locking member for the holding means that is adapted to conform somewhat to the shape of the opening through which the bolt-like member extends. Thus, in the case of the bolt passing through a slot, the resilient cupped washer will seat itself in the slot and further prevent turning of the parts when the parts are in clamping position.

Other objects and advantages of my invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a fragmentary front elevational view of a license plate showing my improved securing means co-operating therewith;

Fig. 2 is a section thereof taken on the line 2—2 of Fig. 1;

Fig. 3 is a section taken on the line 3—3 of Fig. 1;

Fig. 4 is a fragmentary sectional view taken substantially on the line 4—4 of Fig. 2;

Fig. 5 is a view of my improved fastening member detached; and

Fig. 6 is a view similar to Fig. 3 showing my improved fastening member applied to a license plate and holder with circular holes therein.

Referring in detail to the drawings, a portion of a license plate 10 is shown as being mounted on a holder 11 in Figs. 1 to 4 inclusive. The plate 10 is shown as being provided with an elongated slot 12 and the holder or bracket member 11 is shown as being provided with a similar slot 13. My improved fastening means is used for securing the members 10 and 11 together and passes through the slots 12 and 13. The fastening means comprises a bolt-like member 14 which is provided with a head 15 having a slot 16 therein with which a screw driver is adapted to engage, being in this respect similar to an ordinary screw head. Said bolt-like member, however, is further provided with a flange portion 17 projecting laterally beyond the outer periphery of the head 15 and being integral with the bolt-like member 14. Said bolt-like member is also provided with a screw-threaded stem portion or shank portion 18 with which a clamping member or clamping nut 19 screw-threadedly engages.

The member 19 is preferably made of sheet metal and is provided with a peripheral clamping edge 20 that is adapted to engage with the member 11 and with an inturned flange portion 21 to provide a thickened portion that is adapted to be screw-threaded to co-operate with the screw-threads on the bolt 14. Extending in the same direction as the flange 20 and beyond the same, are the fingers 22 that are adapted to extend into the slots 12 and 13 to hold the member 19 from turning relative to the plate 10 and holding member 11. Mounted between the flange 17 and the license plate 10 is a cup shaped washer or locking member 23 that is preferably made of resilient material and which has the outer periphery thereof which is indicated by the numeral 24 engaging with the flange 17. The member 23 is of yielding and preferably of resilient material and is adapted to be distorted or shape itself to the surface of the member 10. Thus, as indicated at 25, said member 23 is adapted to bow out into the opening or slot 12 and due to such bowing out or bending under pressure, a pair of shoulders or ridges will be formed at 26 along the straight edges of the slot 12, thus acting as an additional means to prevent the parts 14 and 19 from having a relative turning movement.

Instead of using the fastening member for securing together a license plate and holder having aligning slots as shown in Figs. 1 to 4 inclusive, the device may be used for securing a license plate 10' to a holding member 11', said members 10' and 11' being provided with circular openings for receiving said bolt-like member 14. When this is done, the member 19 is reversed and the fingers 22 extend away from the member 11, serving then as convenient finger holds for turning the member 19 on the bolt-like member 18 acting very similarly to a winged nut when used in this manner. In both arrangements, the resilient washer 22 acts as a lock washer and holds very firmly due to the fact that the cupped shape thereof causes the outer edge portion 25 to engage with the flange 17 of the bolt-like member at a considerable distance from the axis of the bolt. Thus, the lever arm of the force exerted by the washer against the flange on the bolt will be considerably greater than if a flat or substantially flat washer is used and the resistance to turning of the bolt-like member will be much greater than if a flat washer were used.

Having thus described my invention, what I desire to claim and secure by United States Letters Patent is:

1. A device of the character described comprising a headed screw-threaded member, a cupped washer under the head thereof and a member having screw-threaded means engaging the threads on said headed member, said last mentioned member being provided with a pair of projections adapted to enter a slot in a member clamped between said head and said second member, said washer having a portion thereof entering said slot.

2. The combination with a pair of slotted members, of means for securing said members together comprising a headed screw-threaded member, a cupped washer under the head thereof having a portion entering the slot in one of said members and a member having screw-threaded means engaging the threads on said headed member, said last mentioned member being provided with a pair of projections adapted to enter said slots to hold said last mentioned member and said slotted members from relative turning.

3. A device of the character described comprising a headed screw-threaded member, a cupped washer under the head thereof and a peripherally flanged member having screw-threaded means engaging the threads on said headed member, said flange being provided with a pair of projections adapted to enter a slot in a member clamped between said head and flanged member.

4. A device of the character described comprising a headed screw-threaded member, a cupped washer under the head thereof with the projecting peripheral portion thereof engaging said head near the periphery thereof and a peripherally flanged member having screw threaded means engaging the threads on said headed member, said peripherally flanged member being provided with a pair of projections adapted to enter a slot in a member clamped between said head and flanged member.

5. A device of the character descibed comprising a headed screw-threaded member, a cupped washer under the head thereof and a peripherally flanged member having screw-threaded means engaging the threads on said headed member, said peripherally flanged member being provided with a pair of projections adapted to enter a slot in a member clamped between said head and flanged member, said washer also having a portion thereof entering said slot.

In witness whereof, I hereunto subscribe my name this 19th day of August, A. D. 1924.

HELGE A. BORRESEN.